(12) United States Patent
Meyer

(10) Patent No.: US 6,179,577 B1
(45) Date of Patent: Jan. 30, 2001

(54) ELECTRIC FUEL PUMP WITH FUEL HEATER

(75) Inventor: Paul Meyer, Fairfield, IL (US)

(73) Assignee: UIS, Inc., Jersey City, NJ (US)

( * ) Notice: Under 35 U.S.C. 154(b), the term of this patent shall be extended for 0 days.

(21) Appl. No.: 09/273,248

(22) Filed: Mar. 20, 1999

(51) Int. Cl.[7] .................................................... F02G 5/00
(52) U.S. Cl. ............................................ 417/313; 123/557
(58) Field of Search ................................. 417/313, 572; 123/557

(56) References Cited

U.S. PATENT DOCUMENTS

| | | | |
|---|---|---|---|
| 4,424,422 | * | 1/1984 | Bell et al. ............................ 219/205 |
| 4,571,481 | * | 2/1986 | Leary .................................. 219/205 |
| 4,997,555 | * | 3/1991 | Church et al. ...................... 210/136 |
| 5,159,915 | * | 11/1992 | Saito et al. .......................... 123/557 |
| 5,231,967 | * | 8/1993 | Baltz et al. .......................... 123/497 |
| 5,378,358 | * | 1/1995 | Park .................................... 210/187 |
| 5,622,623 | | 4/1997 | Stone . |
| 5,670,042 | | 9/1997 | Clausen et al. . |
| 5,770,065 | | 6/1998 | Popoff et al. . |
| 5,807,481 | | 9/1998 | Hodgkins et al. . |
| 5,858,227 | | 1/1999 | Stone et al. . |

* cited by examiner

Primary Examiner—Charles G. Freay
(74) Attorney, Agent, or Firm—Polster, Lieder, Woodruff & Lucchesi, L.C.

(57) ABSTRACT

An assembly (10) for pumping fuel from a fuel source to an engine combusting the fuel comprises a housing (14), and a fuel pump (12) mounted in the housing. One end (18) of the housing defines a fuel inlet (20a, 20b) for the pump. A fuel filter (16) is mounted externally of the housing and fuel drawn into the fuel pump flows through the filter. A valve member (22) is fitted onto the end of the housing adjacent the fuel inlet for opening and closing the fuel inlet. The valve member is movable by the fuel filter during its installation to move the valve member to a position at which the fuel inlet is open. Removal of the filter causes the valve member to be moved to a position blocking the fuel inlet. A heater (40a, 40b) is carried on the valve member and is installed adjacent the fuel inlet. The heater heats fuel flowing into the fuel inlet to a predetermined temperature as the fuel is drawn into the fuel pump. A thermal switch (62) also carried on the valve member controls power to the heater to activate the heater when the fuel temperature is below the predetermined temperature.

20 Claims, 3 Drawing Sheets

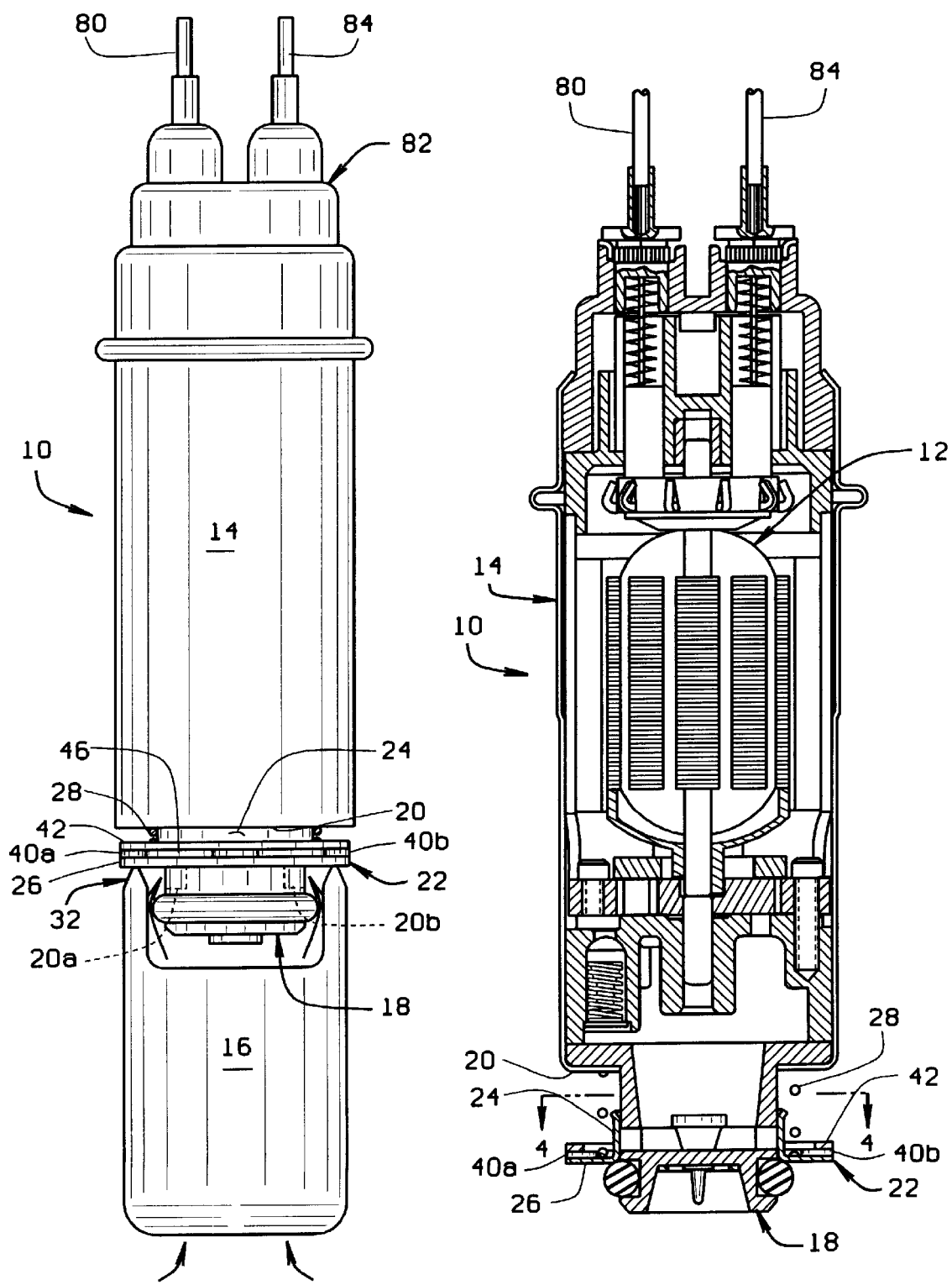

ELECTRIC FUEL PUMP WITH FUEL HEATER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to electric fuel pumps, and more particularly, to an electric fuel pump and fuel filter assembly having a heater located at an inlet to the pump to heat fuel drawn through the filter into the pump if the fuel temperature is less than a predetermined value.

In automotive and marine applications, a vehicle or boat is exposed to a wide range of temperature conditions. An engine used to power the vehicle or boat is supplied fuel from a tank or reservoir which typically is not insulated so fuel residing in the tank is at close to ambient temperature. If the temperature is warm or hot, this can create certain problems, for example, vapor lock. The invention set forth in this application is directed to solving fuel delivery problems when the temperature is cool or cold.

Fuel delivery systems typically employ an electric fuel pump for drawing fuel from the tank or reservoir and delivering it, under pressure, to the engine. A fuel filter is often interposed in a fuel intake path to the pump to remove unwanted materials (dirt, dust, and debris) from the fuel. One type of fuel filter made by the Parker Hannifin Company is designed so that when a filter is installed, the inlet to the fuel filter is unblocked so fuel is drawn through the filter into the pump. If the filter is removed, the fuel inlet is blocked so no fuel can be drawn into the pump. The present invention is usable with this type of filter to provide a means of heating the fuel, when the filter is in place, so the fuel pumped to the engine is at a desired temperature.

BRIEF SUMMARY OF THE INVENTION

Among the several objects of the present invention may be noted the provision of a fuel pump and fuel pump/fuel filter assembly used on vehicles and boats to provide fuel to an engine;

the provision of such pump or assembly to include a heater at an inlet to the pump for heating fuel drawn into the pump to a desired temperature;

the provision of such a pump or assembly in which a valve member for opening and closing the inlet is operable by insertion or removal of the filter to open or close the inlet, and a heater is provided with the valve member for heating the fuel;

the provision of such a pump or assembly in which the heater is carried by the valve member and positioned adjacent at the inlet to heat fuel as it flows into the inlet;

the provision of such a pump or assembly having more than one fuel inlet, each opened and closed by the same valve member, and a separate heater is provided for each inlet;

the provision of such a pump or assembly to include a temperature sensor sensing fuel temperature to operate the heater only if the fuel temperature is below a particular temperature;

the provision of such a pump or assembly to further include a water sensor located adjacent the fuel inlet to determine if fuel flowing into the pump is contaminated with water;

the provision of such a pump or assembly in which all the wiring for the various components are commonly routed through a fuel pump housing to simplify installation and removal of the assembly;

the provision of such a pump or assembly in which the fuel heater is insulated;

the provision of such a pump or assembly which is available in different sizes for use in a wide variety of vehicles and boats; and, the provision of such a pump or assembly which is relatively low cost, easy to manufacture, and is readily installed in a fuel tank or reservoir.

In accordance with the invention, generally stated, an assembly for pumping fuel from a fuel source to an engine combusting the fuel comprises a housing, and a fuel pump mounted in the housing. One end of the housing defines a fuel inlet for the pump. A fuel filter is mounted externally of the housing and fuel drawn into the fuel pump flows through the filter. A valve member is fitted onto the end of the housing adjacent the fuel inlet for opening and closing the fuel inlet. The valve member is movable by the fuel filter during its installation to move the valve member to a position at which the fuel inlet is open. Removal of the filter causes the valve member to be moved to a position blocking the fuel inlet. A heater is carried on the valve member and is installed adjacent the fuel inlet. The heater heats fuel flowing into the fuel inlet, when the inlet is open, to a predetermined temperature as the fuel is drawn into the fuel pump. A thermal switch mounted on the valve member is electronically connected to the heater to activate the sensor when the fuel temperature is less than the predetermined temperature. Other objects and features will be in part apparent and in part pointed out hereinafter.

BRIEF DESCRIPTION OF THE SEVERAL VIEWS OF THE DRAWINGS

In the drawings,

FIG. 1 is an elevational view of a fuel pump assembly of the present invention;

FIG. 2, sectional view of a pump portion of the assembly;

Corresponding reference characters indicate corresponding parts throughout the drawings.

DETAILED DESCRIPTION OF THE INVENTION

Figure 3:
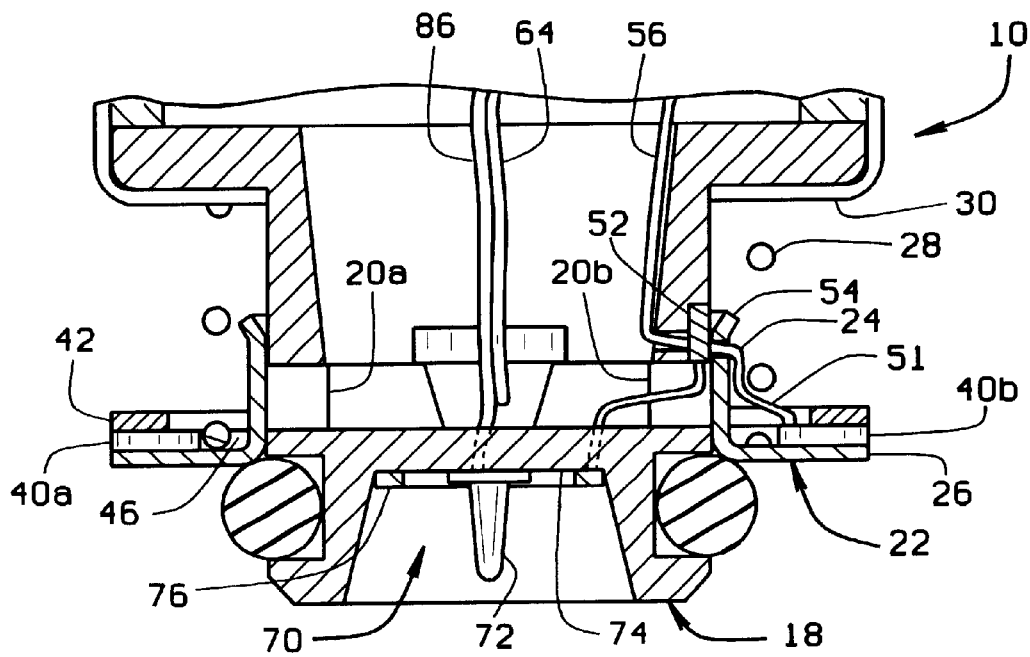
FIG. 3 is an enlarged sectional view of a fuel inlet end of the assembly showing installation of fuel heaters, a temperature sensor, and a water sensor.

Referring to the drawings, a fuel pump assembly for pumping fuel from a source (not shown) to an engine (also not shown) combusting the fuel is indicated generally 10 in FIG. 1. The assembly includes a fuel pump 12 (see FIG. 2) installed in a housing 14, and a fuel filter 16 mounted at a fuel inlet end 18 of the pump. The fuel inlet is defined by the pump housing. As shown in FIG. 1, fuel filter 16, which is commercially available from the Parker Hannifin Company is mounted externally of the housing. Fuel drawn into the fuel pump flows through the filter as indicated by the arrows.

As shown in FIGS. 1–3, the fuel pump has a pair of opposed fuel inlets 20a, 20b. A valve member indicated generally 22 is installed on the outside of the housing, at the fuel inlet end 18, for opening and closing these inlets. Valve member 22 includes an annular flange 24 which extends about end 18 and a plate 26 integrally formed with the flange and extending outwardly from the side of end 18. A bias spring 28 has one end seated against plate 26 and the other end seated against an underside 30 of housing 14. The spring urges the valve member downwardly so flange 24 covers the fuel inlets 20a, 20b and prevents fuel from flowing to pump 12. As further shown in FIG. 1, when filter 16 is installed, an annular tip end 32 of the filter pushes against an underside of plate 26 to move the valve member against the force of spring 28 and open fuel inlets 20a, 20b. Typically, so long as the fuel filter is in place, the fuel inlets remain open. When the filter is removed, the valve member 22 is moved by the force of the spring to shut off the inlets.

Figure 5A:
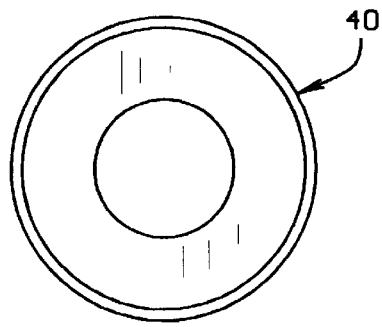
FIGS. 5A and 5B are respective plan and elevational views of a PTC heater used to heat the fuel.
Figure 5B:

In accordance with the present invention, a heater 40 is carried on valve member 22 and is installed on the valve member so to be adjacent a fuel inlet 20. Since assembly 10 includes two fuel inlets, two heaters 40a, 40b are carried on the valve member; each heater being located adjacent one of the fuel inlets 20a, 20b. When energized, the heaters heat fuel flowing into a respective fuel inlet to a predetermined temperature. This is done to improve the efficiency of the operation of the fuel pump and delivery of fuel to the engine. As shown in FIGS. 5A and 5B, the heaters 40 are PTC type heaters having a wafer shape. PTC heaters are known in the art and their operation will not be described.

Figure 4:
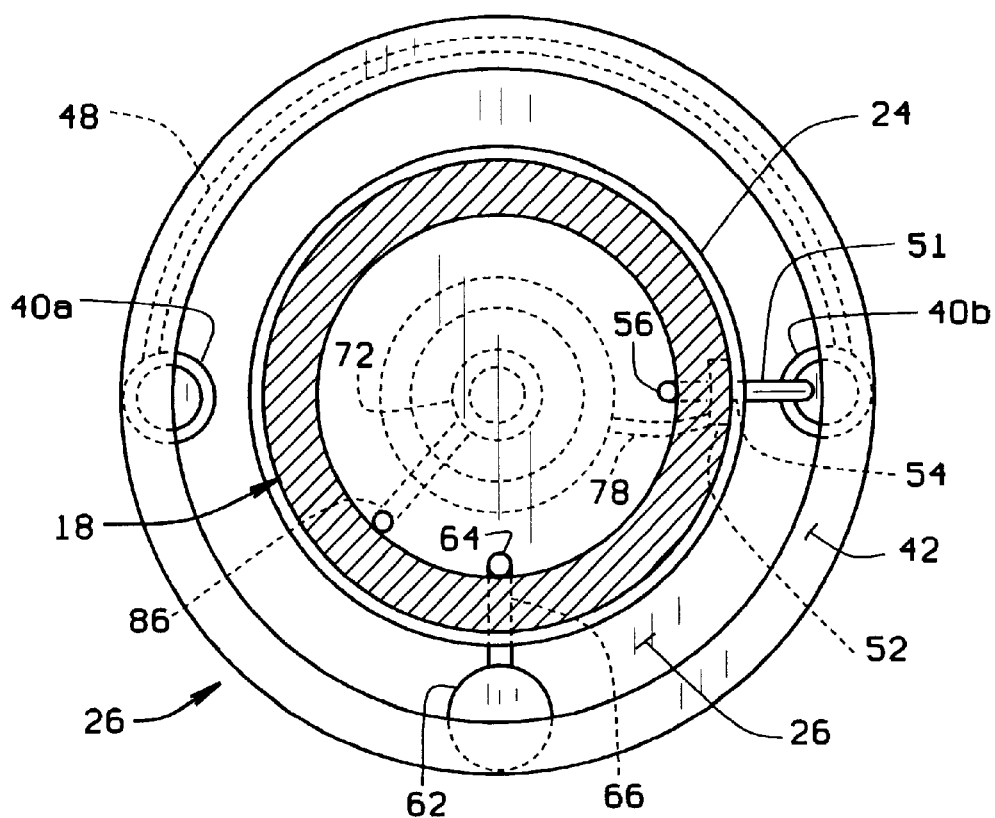
FIG. 4 is an end plan view of the inlet end of the pump.
Figure 6:
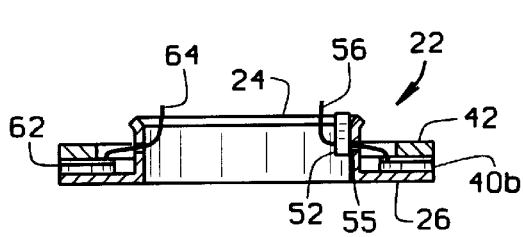
FIG. 6 is a sectional view of a valve member of the pump illustrating electrical wiring connections to the thermal switch and one of the heaters.
Figure 7A:
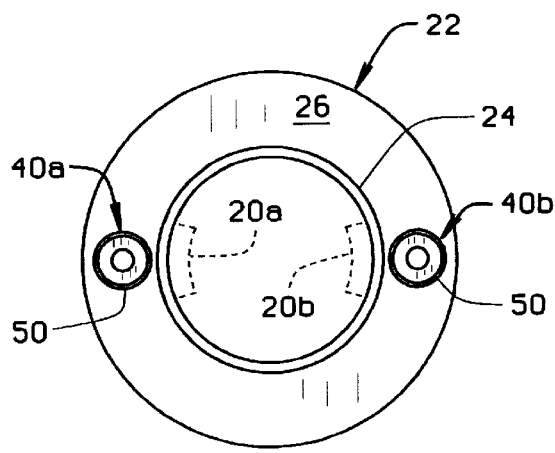
FIGS. 7A and 7B are a respective plan view and an elevational view, in section, of a second method of mounting a heater to the valve member; and, FIG. 8 is a schematic illustrating operation of the heaters.
Figure 7B:
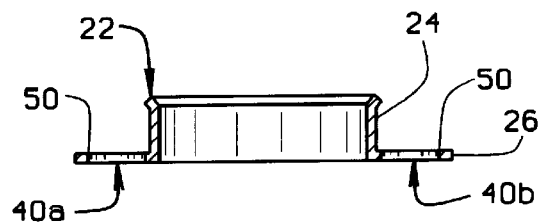

Referring to FIGS. 3, 4, and 6, one method of installing the heaters so they can be carried by valve member 22 is shown. The wafers are mounted on the top of plate 26, as viewed in the drawings, so to be adjacent the respective fuel inlets in housing 14. A second plate 42 fits over the heaters so to sandwich them between the two plates. Plate 42 is an annular plate whose outer diameter corresponds to that of plate 26. The inner diameter of the plate is such that when in place, a portion of the wafer is exposed. This allows an electrical lead 44 to be routed to one of the heaters, heater 40a as shown in the drawings, from a power source. An insulation material 46 is sandwiched between plates 26 and 42 in the space between the heaters as shown in FIG. 3. Alternately, as shown in FIGS. 7A and 7B, openings 50 are formed in plate 26. The diameters of the openings correspond to those of the heater 40 wafers. These recesses or pockets accommodate the heaters to position them adjacent the respective fuel inlets.

Figure 8:
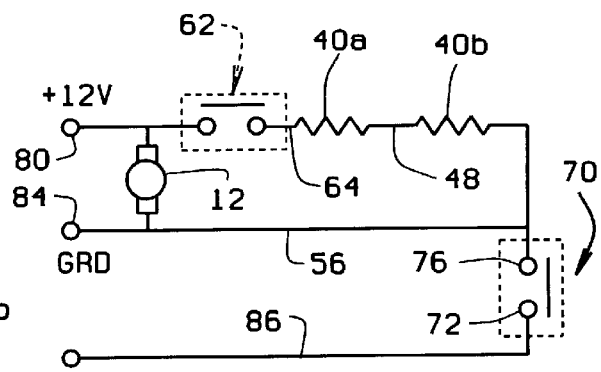

Referring to FIG. 8, a schematic of a heater circuit employing heaters 40a, 40b includes a power source (not shown) which supplies +12 VDC to fuel pump 12 and, in parallel, to the heaters. As further shown, the heaters are connected in series by an electrical lead 48 which extends between plates 26 and 42. Heater 40b is connected to the ground side of the power source by an electrical lead 51 which extends between the heater and an electrical terminal 52 carried on flange 24 of valve member 22 through an opening 55 in the sidewall of inlet end 18. This terminal 52 comprises a sliding contact since it moves with the valve member as the valve member moves. A ground wire 56 extends from terminal 52 to the return side of the power source.

The heaters are, in turn, series connected with a thermal switch 62. Switch 62 is shown in FIG. 4 as being mounted outside inlet end 18 of housing 14 so to be in contact with fuel flowing through filter 16 to the pump inlets 20a, 20b. For this purpose, the thermal switch is mounted in any convenient manner to plate 26 of the valve member; for example, midway about the plate between the heaters. An electrical lead 64 passes through an opening 66 formed in a sidewall of inlet end 18 of the housing for connecting the power source to the thermal switch. The circuit path from the power source to the heaters is routed through the switch. Switch 62 is set to open when the temperature of the fuel rises above a predetermined temperature which is, for example, 60° F. (16° C.). Accordingly, when the pump is in operation, fuel flowing through filter 16 into housing 18 flows over the thermal switch. So long as the fuel temperature is less than the predetermined value, the switch remains closed and the heaters are activated. When the fuel temperature reaches or exceeds the thermal switch setting, the switch opens interrupting the circuit path to the heaters, deactivating them.

In addition to the foregoing elements of assembly 10, the assembly further includes a water sensor indicated generally 70 in the drawings. Sensor 70 first includes an electrical contact 72 which is an elongate terminal that is attached to a base 74 of housing 18 and outwardly from the housing along a longitudinal axis of the housing. Sensor 70 includes a second contact 76 which is an annular shaped contact also installed to the base of the housing and in a spaced relation from contact 72. Contact 76 is connected to ground wire 56 through an electrical lead 78 which is in contact with sliding contact 52 mounted on valve member 22. In operation, fuel flowing between contacts 72, 76 has an electrical resistance value, so a voltage impressed across the sensor will produce a current whose value is proportional to this resistance. If water is present in the fuel, then the resistance value of the fluid changes (i.e., decreases) and the resulting change in current can be sensed as an output of the sensor.

The electrical wires routed to the various components (heaters, thermal switch, water sensor) are all commonly routed through the interior of housing 14. This eliminates wiring clutter on the outside of the housing so as to simplify installation and removal of assembly 10. The positive side of the power supply is connected to assembly 10 through an electrical terminal 80 at an end 82 of the housing opposite end 18 thereof. Similarly, the ground side of the power supply is connected to assembly 10 through an electrical terminal 84. Consequently, assembly 10 only requires one additional electrical output terminal; this being an electrical lead 86 which extends between contact 72 of sensor 70, and the signal output of the sensor.

What has been described is a fuel pump/fuel filter assembly used on vehicles and boats to provide fuel to an engine, and including a heater at the pump inlet to heat fuel drawn into the pump to a desired temperature. A valve member is operable to open and close the inlet and the valve member carries the heater. The heater is insulated from the valve member. A temperature sensor senses fuel temperature and operates the heater only if the fuel temperature is below a set temperature. Further, a water sensor is located adjacent the fuel inlet to determine if water is present in the fuel. The pump assembly is available in different sizes.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for delivering fuel from a fuel source to an engine comprising:
    a fuel pump having a fuel inlet communicating with the source of fuel and a fuel outlet communicating with the engine;
    a valve member movable from a first position directly blocking the fuel inlet to a second position unblocking the fuel inlet; and,
    a heater carried on the valve member for heating fuel flowing into the fuel inlet when the fuel inlet is open, the heater being positioned adjacent the fuel inlet to heat the fuel to a predetermined temperature as the fuel is drawn into the fuel pump.

2. The apparatus of claim 1 wherein further including a thermal switch sensing the temperature of fuel flowing into the fuel inlet, the heater being activated when the switch senses the fuel temperature is below the predetermined temperature and the heater being deactivated when the switch senses the fuel temperature is at or above the predetermined temperature.

3. The apparatus of claim 1 further including a water sensor positioned adjacent the fuel inlet to sense the presence of water in fuel being drawn into the fuel pump and to provide an indication thereof.

4. The apparatus of claim 2 wherein said fuel pump has at least two fuel inlets and a separate heater is carried on the valve member and positioned adjacent each respective fuel inlet to heat the fuel drawn into the fuel pump through any of the fuel inlets.

5. The apparatus of claim 4 wherein said heaters are electrically connected in series with others and in series with the thermal switch for the thermal switch to activate and deactivate both heaters.

6. The apparatus of claim 1 wherein the fuel pump includes a housing in one end of which the fuel inlet is formed, the valve member includes a plate fitted about an outside of the housing adjacent the fuel inlet and movable with respect thereto, and the heater is mounted on the plate.

7. The apparatus of claim 6 wherein the valve member comprises a pair of plates spaced apart from each other, and the heater is fitted between the plates.

8. The apparatus of claim 7 further including an insulation material sandwiched between the plates and surrounding the heater.

9. The apparatus of claim 6 wherein the plate has a recess therein and the heater is fitted into the recess.

10. The apparatus of claim 3 wherein the fuel pump includes a housing in one end of which the fuel inlet is formed, and electrical connections for the heater, thermal switch, and water sensor are commonly routed through an inside of the housing.

11. The apparatus of claim 10 further including said water sensor and an electrical circuit including said thermal switch and said heaters share a common ground path.

12. An assembly for pumping fuel from a fuel source to an engine comprising:
    a housing;
    a fuel pump mounted in the housing with one end of the housing defining a fuel inlet for the fuel pump;
    a fuel filter external of the housing for fuel drawn into the fuel inlet to flow through the filter;
    a valve member fitted onto the end of the housing directly adjacent the fuel inlet for opening and closing the fuel inlet, the valve member being movable by the fuel filter during installation thereof to move the valve member to a position at which the fuel inlet is open, removal of the fuel filter causing the valve member to be moved to a position blocking the fuel inlet; and,
    a heater carried on the valve member for heating fuel flowing into the fuel inlet when the fuel inlet is open, the heater being positioned adjacent the fuel inlet to heat the fuel to a predetermined temperature as the fuel is drawn into the fuel pump.

13. The assembly of claim 12 wherein the valve member includes a plate fitted about an outside of the housing adjacent the fuel inlet and movable with respect thereto, and the heater is mounted on the plate.

14. The assembly of claim 12 wherein said housing has at least two fuel inlets formed therein and a separate heater is carried on the valve member and positioned adjacent each respective fuel inlet to heat the fuel drawn into the fuel pump through any of the fuel inlets.

15. The assembly of claim 14 wherein the valve member comprises a pair of plates spaced apart from each other, the heater is fitted between the plates, and an insulation material is sandwiched between the plates and surrounds the heater.

16. The assembly of claim 14 wherein the plate has a recess therein and the heater is fitted into the recess.

17. The assembly of claim 14 further including a thermal switch sensing the temperature of fuel flowing into the fuel inlet, said heater being electrically connected to the thermal switch for the heater to be activated by the thermal switch for the heaters to be activated by the thermal switch when the fuel temperature is below the predetermined temperature, and the heaters being deactivated by the thermal switch when the fuel temperature is at or above the predetermined temperature.

18. The assembly of claim 17 wherein the heaters are PTC heaters connected in series with each other and with the thermal switch.

19. The assembly of claim 14 further including a water sensor positioned adjacent the fuel inlet to sense the presence of water in fuel being drawn into the fuel pump.

20. The assembly of claim 19 wherein the fuel pump has a pair of electrical terminals for routing power to the fuel pump and the thermal switch and heaters are electrically connected to the same terminals for wiring to the thermal switch and heaters to be routed inside the housing.

* * * * *